United States Patent
Hasegawa et al.

(10) Patent No.: US 9,780,692 B2
(45) Date of Patent: Oct. 3, 2017

(54) CONTROL DEVICE OF NEUTRAL-POINT-CLAMPED POWER CONVERTER APPARATUS, AND CONTROL METHOD OF NEUTRAL-POINT-CLAMPED POWER CONVERTER APPARATUS

(71) Applicant: KABUSHIKI KAISHA TOSHIBA, Minato-ku (JP)

(72) Inventors: Ryuta Hasegawa, Hino (JP); Teruyuki Ishizuki, Tokyo (JP); Takashi Fujita, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/880,550

(22) Filed: Oct. 12, 2015

(65) Prior Publication Data
US 2016/0111975 A1    Apr. 21, 2016

(30) Foreign Application Priority Data
Oct. 20, 2014   (JP) ................................. 2014-214004

(51) Int. Cl.
H02M 7/487   (2007.01)
H02M 1/00    (2006.01)

(52) U.S. Cl.
CPC .... *H02M 7/487* (2013.01); *H02M 2001/0064* (2013.01)

(58) Field of Classification Search
CPC ......... H02M 7/487; H02M 2001/0064; H02M 5/458; H02M 2001/123; H02M 7/062;
(Continued)

(56) References Cited

U.S. PATENT DOCUMENTS 5,627,742 A    5/1997   NAKATA, et al.
5,790,396 A *  8/1998   Miyazaki .............. H02M 7/487
                                                    363/41
(Continued)

FOREIGN PATENT DOCUMENTS

CN    103683288 A    3/2014
EP    0 642 212 A1   3/1995
(Continued)

OTHER PUBLICATIONS

Office Action dated May 8, 2017 in European Patent Application No. 15 189 687.5.
(Continued)

*Primary Examiner* — Gustavo Rosario Benitez
(74) *Attorney, Agent, or Firm* — Oblon, McClelland, Maier & Neustadt, L.L.P.

(57) ABSTRACT

According to one embodiment, there is provided a control device of a neutral-point-clamped power converter apparatus including a converter configured to convert current which were obtained by passing a d-axis current and a q-axis current of a rotating coordinate system through a filter having a time constant which is greater than an inverse number of a fundamental wave frequency of a three-phase currents, to three-phase currents, and a controller configured to calculate, based on the three-phase currents converted, a zero-phase voltage instruction value for controlling voltages into which a DC input voltage is divided at a neutral point, as an instruction value which is superimposed on three-phase voltage instruction values.

5 Claims, 10 Drawing Sheets

(58) Field of Classification Search
CPC ........ H02M 7/219; H02M 1/126; H02M 1/14; H02M 1/12; H02P 27/08; H02P 27/06
See application file for complete search history.

(56) References Cited

U.S. PATENT DOCUMENTS

| | | | | |
|---|---|---|---|---|
| 6,154,379 | A * | 11/2000 | Okita | H02M 7/48 363/40 |
| 6,316,920 | B1 | 11/2001 | Huggett, et al. | |
| 2008/0298103 | A1 * | 12/2008 | Bendre | H02M 7/487 363/89 |
| 2011/0134672 | A1 * | 6/2011 | Sato | H02M 1/10 363/126 |
| 2011/0304290 | A1 | 12/2011 | Ito, et al. | |
| 2013/0128632 | A1 * | 5/2013 | Yang | H02M 7/487 363/37 |
| 2013/0221879 | A1 * | 8/2013 | Yokokawa | H02P 21/22 318/400.02 |
| 2014/0009980 | A1 * | 1/2014 | Divan | H02M 5/4585 363/37 |
| 2016/0028301 | A1 * | 1/2016 | Murakami | H02J 3/01 363/41 |

FOREIGN PATENT DOCUMENTS

| | | |
|---|---|---|
| JP | 2011-239564 | 11/2011 |
| JP | 2013-255317 | 12/2013 |

OTHER PUBLICATIONS

Extended European Search Report dated Mar. 23, 2016 in Patent Application No. 15189687.5.
Thiago B. Soeiro, et al., "Comparison of 2- and 3-level Active Filters with Enhanced Bridge-Leg Loss Distribution" 8th International Conference on Power Electronics—ECCE Asia, IEEE, ThH2-4, XP031956115, May 30-Jun. 3, 2011, pp. 1835-1842.

* cited by examiner

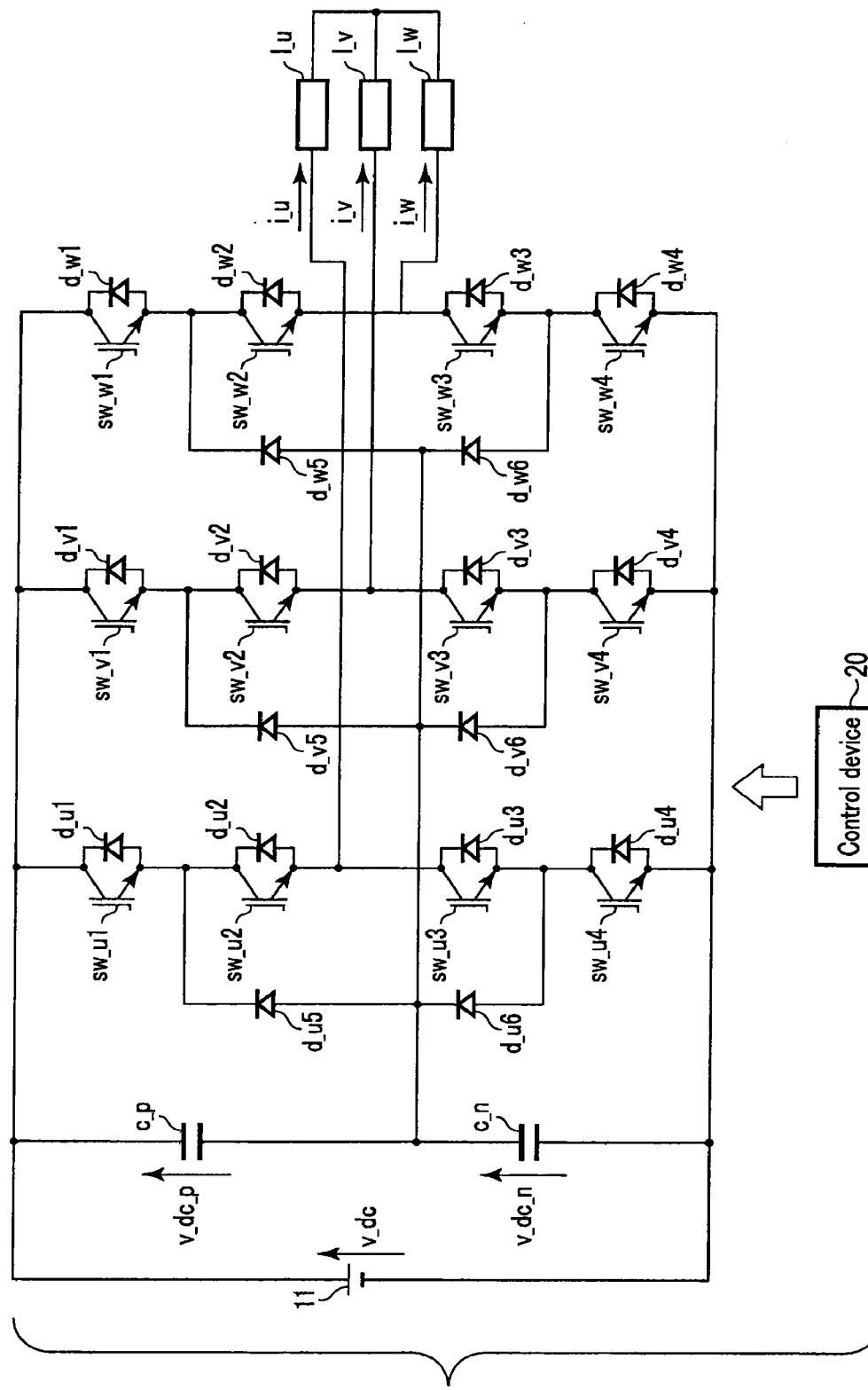
F I G. 1

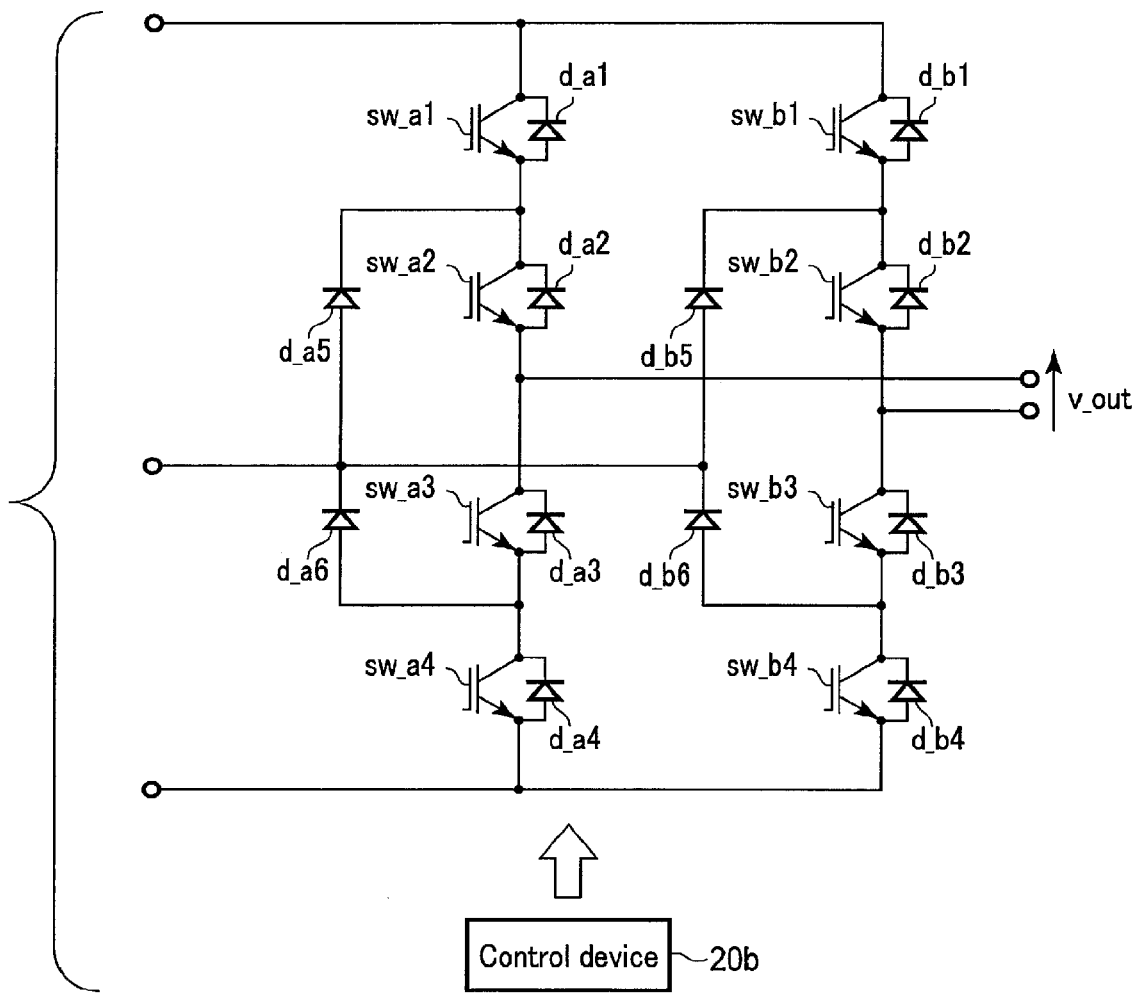
F I G. 5

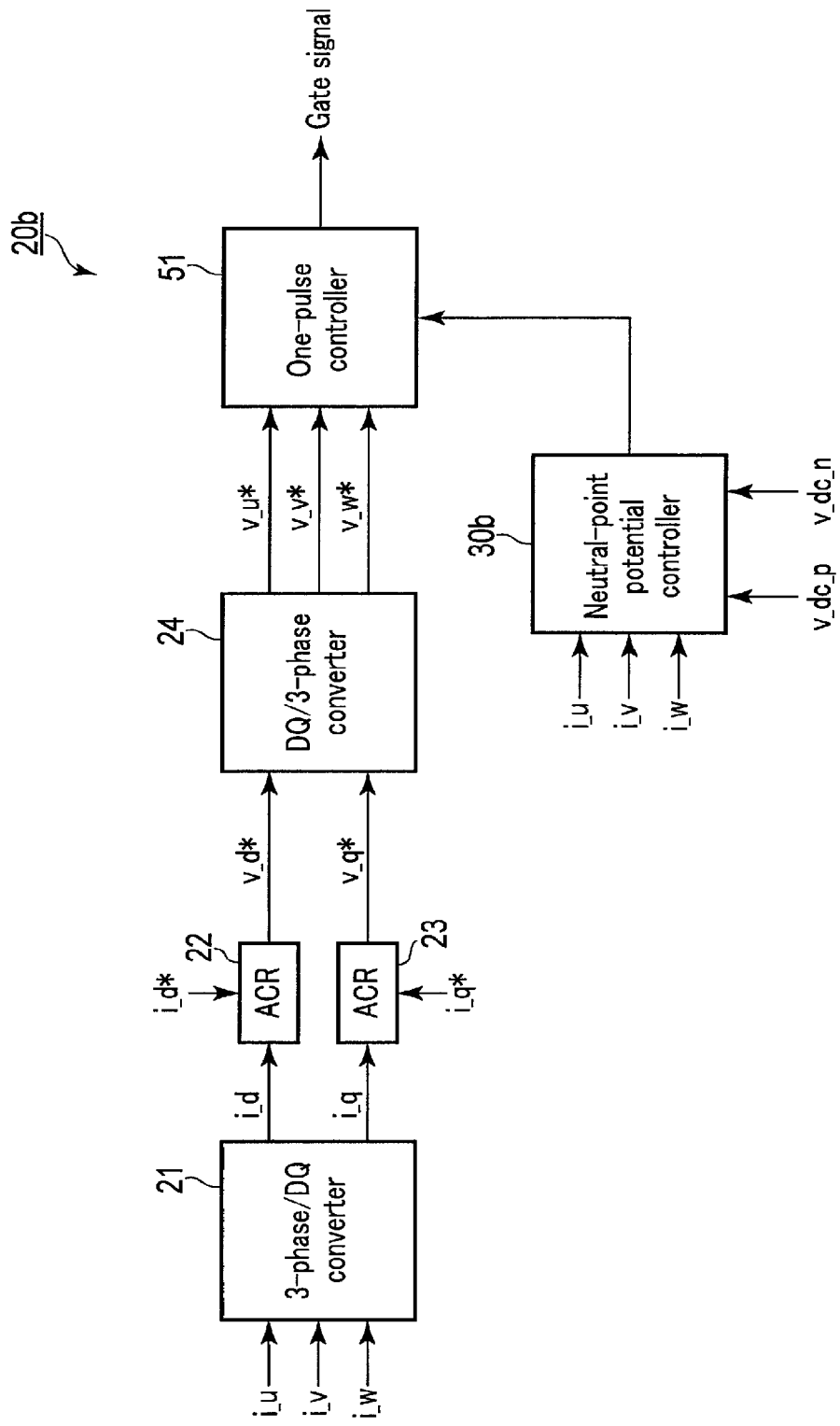
F I G. 6

| v_out | v_po−v_on | i_u | sw_a1 | sw_a2 | sw_a3 | sw_a4 | sw_b1 | sw_b2 | sw_b3 | sw_b4 |
|---|---|---|---|---|---|---|---|---|---|---|
| +v_dc/2 | + | + | ON | ON | OFF | OFF | OFF | ON | ON | OFF |
| +v_dc/2 | + | − | OFF | ON | ON | OFF | OFF | OFF | ON | ON |
| +v_dc/2 | − | + | OFF | ON | ON | OFF | OFF | OFF | ON | ON |
| +v_dc/2 | − | − | ON | ON | OFF | OFF | ON | ON | ON | OFF |
| −v_dc/2 | + | + | OFF | OFF | ON | ON | OFF | ON | OFF | OFF |
| −v_dc/2 | + | − | OFF | OFF | ON | ON | OFF | ON | ON | OFF |
| −v_dc/2 | − | + | OFF | ON | ON | OFF | ON | ON | ON | OFF |
| −v_dc/2 | − | − | OFF | ON | ON | OFF | ON | ON | OFF | OFF |

FIG. 7

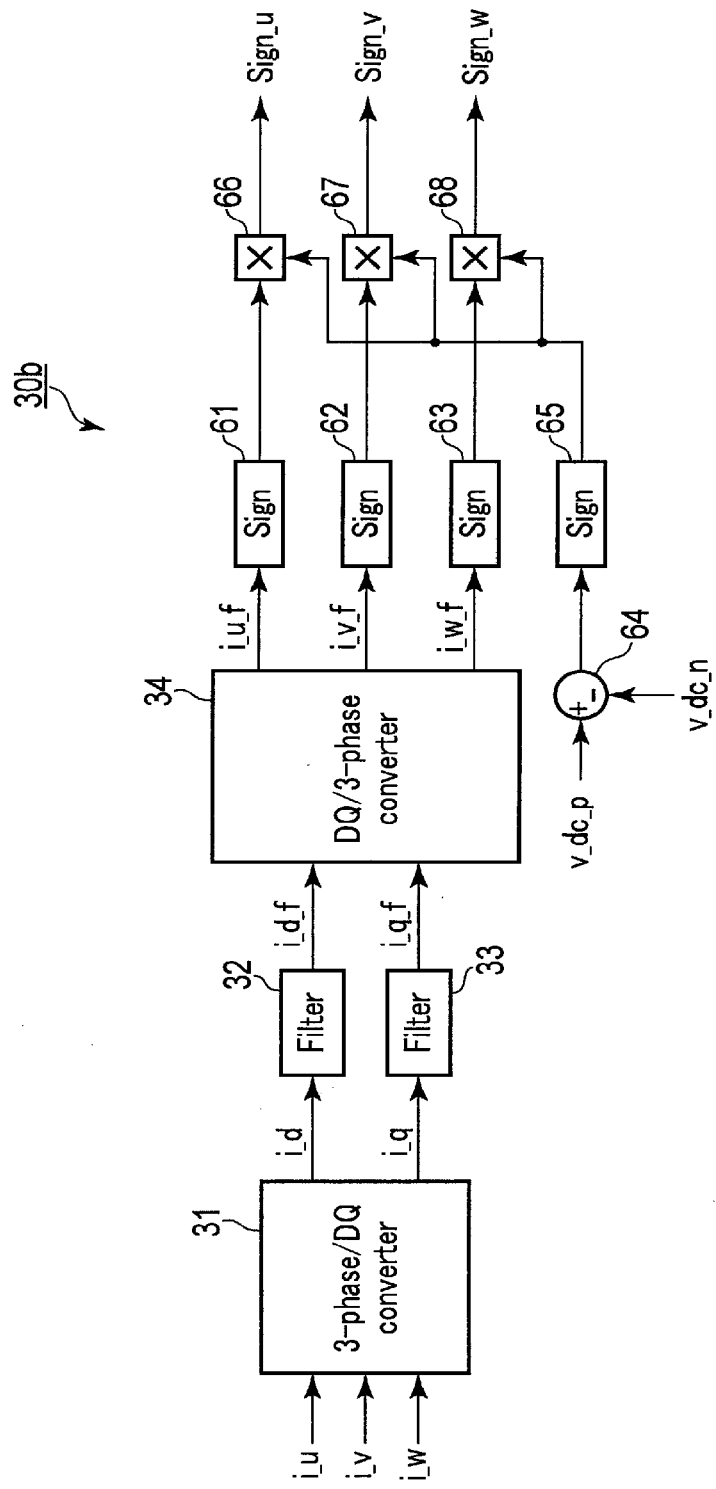
F I G. 8

CONTROL DEVICE OF NEUTRAL-POINT-CLAMPED POWER CONVERTER APPARATUS, AND CONTROL METHOD OF NEUTRAL-POINT-CLAMPED POWER CONVERTER APPARATUS

CROSS-REFERENCE TO RELATED APPLICATION

This application is based upon and claims the benefit of priority from Japanese Patent Application No. 2014-214004, filed Oct. 20, 2014, the entire contents of which are incorporated herein by reference.

FIELD

Embodiments of the invention relate generally to a control device of a neutral-point-clamped power converter apparatus, and a control method of the neutral-point-clamped power converter apparatus.

BACKGROUND

A neutral-point-clamped (NPC) power converter apparatus is configured such that at least four switching elements are connected in series, and can output a high voltage of several kV~several-ten kV. In addition, since the neutral-point-clamped power converter apparatus outputs phase voltages of three levels, a higher harmonic wave that occurs is small. Thus, the ripple of the waveform is small, and a current with a smooth waveform is supplied to loads. In addition, of the above-described four switching elements, two elements are switched at the same timing, and the other two are not switched. Thus, the switching loss of the apparatus as a whole is small. Therefore, the neutral-point-clamped power converter apparatuses are widely used in railway cars, driving apparatuses for industrial uses, and power system voltage stabilizing apparatuses.

In the case of using the neutral-point-clamped power converter apparatus having the above-described features, neutral-point potential control is required. The neutral-point potential control is a control to equally divide a DC input voltage by a high-potential-side capacitor and a low-potential-side capacitor, and to equally hold a high-potential-side DC voltage and a low-potential-side DC voltage. In the case where the neutral-point-clamped power converter apparatus is applied to a two-phase output or a three-phase output, there is known a method of executing the neutral-point potential control by applying to the respective phases an identical voltage (zero-phase voltage) which is calculated from voltage instruction values and load currents of the respective phases.

However, when the load current is small, for example, when the load current has a value close to zero, a higher harmonic wave current is relatively greater than a fundamental wave current. Thus, there is a case in which the sign of the fundamental wave current, which contributes to a neutral-point potential variation, and the sign of a detected load current are different. As a result, in some cases, the sign of the calculated zero-phase voltage is reverse to the sign of the voltage that is to be normally applied to the apparatus, and the high-potential-side DC voltage and low-potential-side DC voltage are not balanced.

BRIEF DESCRIPTION OF THE DRAWINGS

FIG. 1 is a view illustrating a configuration example of a neutral-point-clamped power converter apparatus in the first embodiment;

FIG. 5 is a view illustrating a configuration example of an NPC leg of the neutral-point-clamped power converter apparatus in the second embodiment;

FIG. 6 is a view illustrating a functional configuration of a control device of the neutral-point-clamped power converter apparatus in the second embodiment;

FIG. 7 is a view illustrating an example of selection of a switching pattern according to a current direction and an output voltage, by the one-pulse controller of the neutral-point-clamped power converter apparatus in the second embodiment;

FIG. 8 is a block diagram illustrating a functional configuration example of the neutral-point potential controller of the control device of the neutral-point-clamped power converter apparatus in the second embodiment;

DETAILED DESCRIPTION

Figure 2:
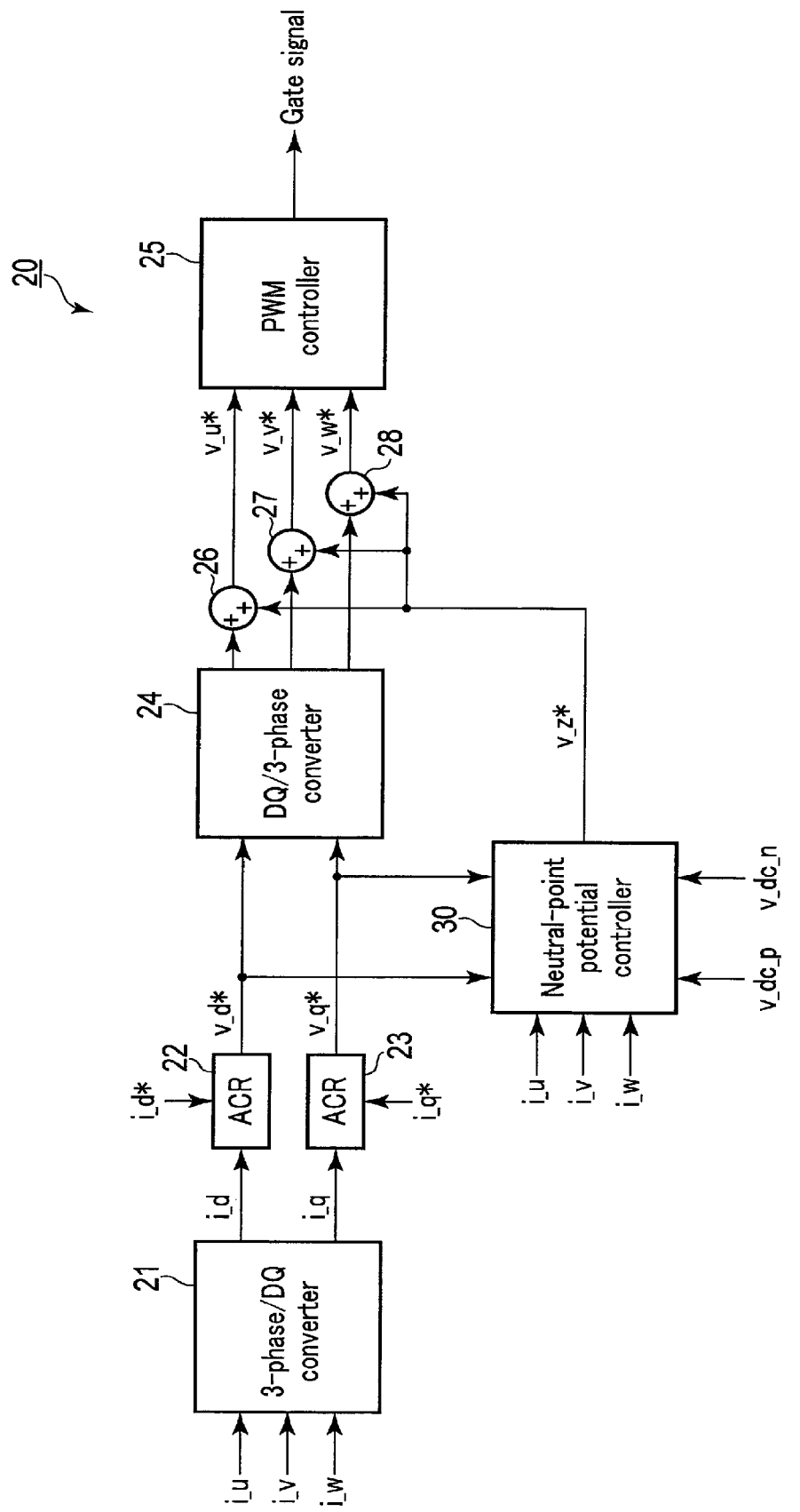
FIG. 2 is a view illustrating a functional configuration of the control device of the neutral-point-clamped power converter apparatus in the first embodiment.

In general, according to one embodiment, there is provided a control device of a neutral-point-clamped power converter apparatus, including a 3-phase/2-phase converter configured to convert three-phase currents flowing to three-phase loads, which are driven by the neutral-point-clamped power converter apparatus that is connected to a DC power supply having three potentials and is capable of outputting voltages of three levels, to a d-axis current and a q-axis current of a rotating coordinate system. The control device includes a 2-phase/3-phase current converter configured to convert a d-axis filter current and a q-axis filter current, which were obtained by passing the d-axis current and the q-axis current through a filter having a time constant which is greater than an inverse number of a fundamental wave frequency of the three-phase currents, to three-phase currents. The control device includes a neutral-point potential controller configured to calculate, based on the three-phase currents converted by the 2-phase/3-phase current converter, a zero-phase voltage instruction value for controlling voltages into which a DC input voltage is divided at a neutral point of the power converter apparatus, as an instruction value which is superimposed on three-phase voltage instruction values for the power converter apparatus.

Embodiments will be explained below with reference to the accompanying drawings. Note that portions common to these drawings will be denoted by the same reference numerals or the same reference numerals given suffixes, and a repetitive explanation will be omitted as needed.

First Embodiment

To begin with, a first embodiment is described.

FIG. 1 is a view illustrating a configuration example of a neutral-point-clamped power converter apparatus in the first embodiment.

As illustrated in FIG. 1, the neutral-point-clamped power converter apparatus in the first embodiment drives three-phase loads of a U phase, V phase and W phase as an inverter. In this neutral-point-clamped power converter apparatus, three NPC legs corresponding to the respective phases are connected in parallel. A high-potential-side capacitor c_p and a low-potential-side capacitor c_n are connected in series between a high-potential-side terminal and a low-potential-side terminal of a DC power supply 11, and a connection point between these capacitors forms a neutral point. Specifically, a DC input voltage v_dc of the DC power supply 11 is divided into a DC voltage v_dc_p and a DC voltage v_dc_n by the high-potential-side capacitor c_p and low-potential-side capacitor c_n. As a result, a neutral-point potential occurs between the capacitor c_p and capacitor c_n.

Hereinafter, taking the U phase as an example, the configuration of the NPC leg is described.

In the NPC leg of the U phase, four self-turn-off switching elements sw_u1, sw_u2, sw_u3 and sw_u4 are connected in series from the high potential side to the low potential side. In addition, free-wheel diodes d_u1, d_u2, d_u3 and d_u4 are connected in parallel with, and in an opposite direction to, the switching elements sw_u1, sw_u2, sw_u3 and sw_u4 in a one-to-one correspondence.

Furthermore, a clamp diode d_u5 is connected between the emitter of the switching element sw_u1 and the neutral point, and a clamp diode d_u6 is connected between the neutral point and the emitter of the switching element sw_u3. The anode of the clamp diode d_u5 is connected to the neutral point, and the cathode of the clamp diode d_u5 is connected to the emitter of the switching element sw_u1. The anode of the clamp diode d_u6 is connected to the emitter of the switching element sw_u3, and the cathode of the clamp diode d_u6 is connected to the neutral point.

The emitter of the switching element sw_u2 and the collector of the switching element sw_u3 are connected to a load 1_u. In this manner, the NPC leg of the U phase is composed of the self-turn-off switching elements sw_u1, sw_u2, sw_u3 and sw_u4, free-wheel diodes d_u1, d_u2, d_u3 and d_u4, and clamp diodes d_u5 and d_u6. The NPC legs of the V phase and W phase have the same configuration as described above. Three-phase currents i_u, i_v and i_w are supplied to three-phase loads 1_u, 1_v and 1_w from the NPC legs of the respective phases.

Next, a control device of the neutral-point-clamped power converter apparatus is described.

FIG. 2 is a view illustrating a functional configuration of the control device of the neutral-point-clamped power converter apparatus in the first embodiment.

As illustrated in FIG. 2, a control device 20 of the neutral-point-clamped power converter apparatus in the first embodiment includes a 3-phase/DQ converter 21, automatic current regulators (ACR) 22 and 23, a DQ/3-phase converter 24, a PWM (Pulse Width Modulation) controller 25, and a neutral-point potential controller 30.

The 3-phase/DQ converter 21 detects three-phase currents i_u, i_v and i_w flowing to the three-phase loads 1_u, 1_v and 1_w. The 3-phase/DQ converter 21 executes 3-phase/DQ conversion (3-phase/2-phase conversion: conversion from a coordinate system at rest to a rotating coordinate system) of the three-phase currents i_u, i_v and i_w. By executing this conversion, the 3-phase/DQ converter 21 outputs a d-axis current i_d of the rotating coordinate system to the automatic current regulator 22, and outputs a q-axis current i_q, which is perpendicular to the d-axis in the rotating coordinate system, to the automatic current regulator 23.

The automatic current regulator 22 executes a PI (proportional-integral) arithmetic operation on the d-axis current i_d so that the d-axis current i_d follows a d-axis current instruction value i_d*. By this arithmetic operation, the automatic current regulator 22 outputs a d-axis voltage instruction value v_d* to the DQ/3-phase converter 24 and neutral-point potential controller 30. In addition, the automatic current regulator 23 executes a PI arithmetic operation on the q-axis current i_q so that the q-axis current i_q follows a q-axis current instruction value i_q*. By this arithmetic operation, the automatic current regulator 23 outputs a q-axis voltage instruction value v_q* to the DQ/3-phase converter 24 and neutral-point potential controller 30.

The DQ/3-phase converter 24 executes DQ/3-phase conversion (2-phase/3-phase conversion: conversion from the rotating coordinate system to the coordinate system at rest) of the d-axis voltage instruction value v_d* and q-axis voltage instruction value v_q*. By executing this conversion, the DQ/3-phase converter 24 outputs, as three-phase voltage instruction values, a U-phase voltage instruction value v_u*0, a V-phase voltage instruction value v_v*0 and a W-phase voltage instruction value v_w*0 to the PWM controller 25.

The neutral-point potential controller 30 calculates a zero-phase voltage instruction value v_z*. This zero-phase voltage instruction value v_z* is a voltage for controlling the voltages into which the DC input voltage v_dc is divided at the neutral point. The zero-phase voltage instruction value v_z* is superimposed (added) on the voltage instruction values v_u*0, v_v*0 and v_w*0 of the respective phases by adders 26, 27 and 28 which correspond to the respective phases. The resultant superimposed values become a U-phase voltage instruction value v_u*, a V-phase voltage instruction value v_v* and a W-phase voltage instruction value v_w* as ultimate three-phase voltage instruction values to the PWM controller 25.

Based on these voltage instruction values, the PWM controller 25 generates, by PWM control, a gate signal of a switching element corresponding to the leg of each phase, and turns on/off each switching element by using this gate signal.

Figure 3:
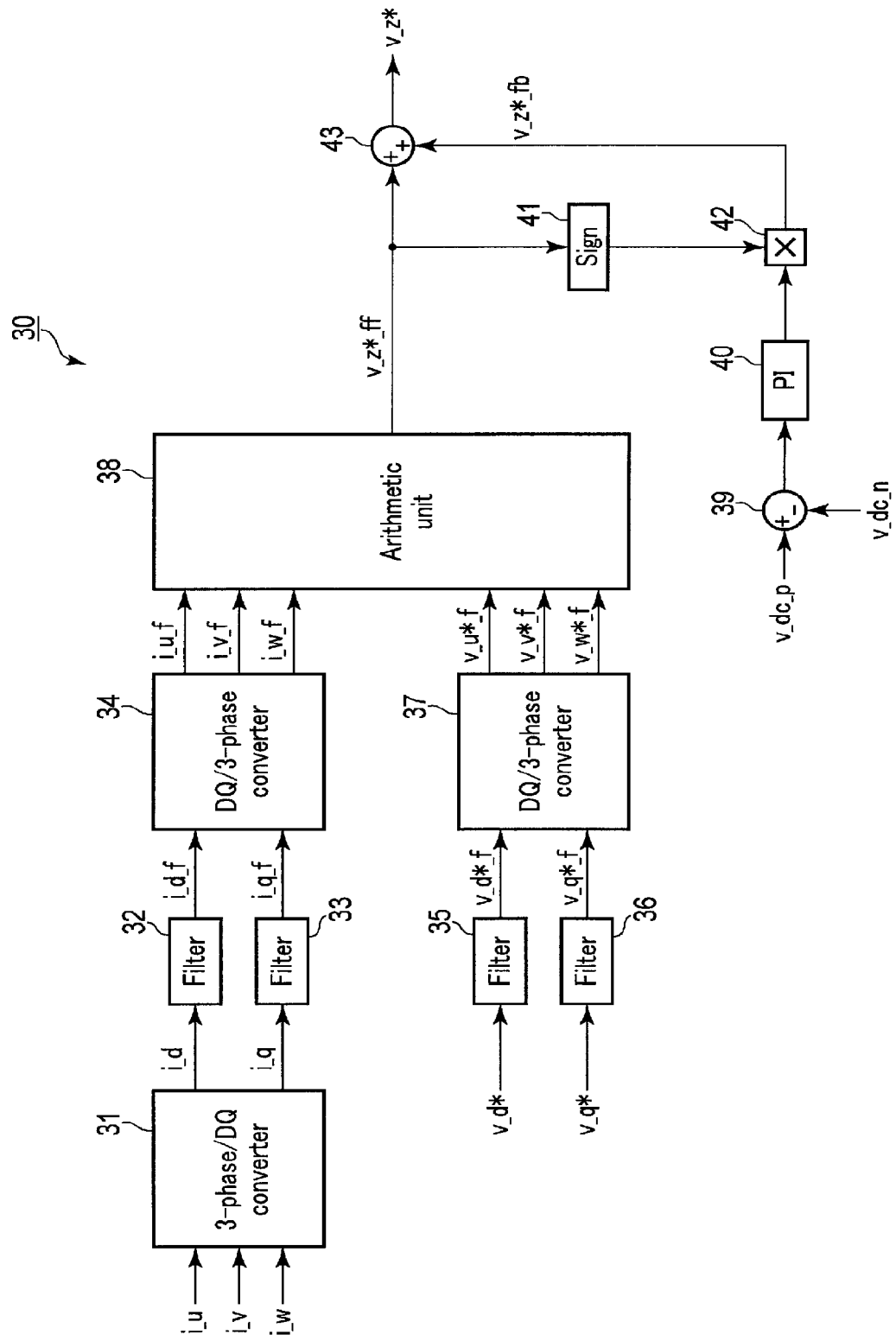
FIG. 3 is a block diagram illustrating a functional configuration example of the neutral-point potential controller of the control device of the neutral-point-clamped power converter apparatus in the first embodiment.

Next, the generation of the above-described zero-phase voltage instruction value v_z* is described. FIG. 3 is a block diagram illustrating a functional configuration example of the neutral-point potential controller of the control device of the neutral-point-clamped power converter apparatus in the first embodiment.

As illustrated in FIG. 3, the neutral-point potential controller 30 includes a 3-phase/DQ converter 31, low-pass filters 32, 33, 35 and 36, a DQ/3-phase converter 34, a DQ/3-phase converter 37, and an arithmetic unit 38.

The zero-phase voltage instruction value v_z* is the sum of a feedforward value v_z*_ff and a feedback value v_z*_fb. To begin with, a description is given of the calculation of the feedforward value v_z*_ff by the neutral-point potential controller 30.

To start with, an arithmetic operation relating to current values for calculating the feedforward value v_z*_ff is described. The 3-phase/DQ converter 31 detects three-phase currents i_u, i_v and i_w and executes 3-phase/DQ conversion of these currents. By this conversion, the 3-phase/DQ converter 31 outputs a d-axis current i_d of the rotating coordinate system to the low-pass filter 32. In addition, the 3-phase/DQ converter 31 outputs, by 3-phase/DQ conversion, a q-axis current i_q, which is perpendicular to the d-axis in the rotating coordinate system, to the low-pass filter 33.

The d-axis current i_d passes through the low-pass filter 32, and is output to the DQ/3-phase converter 34 as a d-axis filter current i_d_f. In addition, the q-axis current i_q passes through the low-pass filter 33, and is output to the DQ/3-phase converter 34 as a q-axis filter current i_q_f.

The time constant of the low-pass filter 32, 33 is greater than an inverse number of the fundamental frequency of the three-phase currents. Besides, when the low-pass filter 32, 33 is a moving-average filter, the moving-average cycle is greater than the inverse number of the fundamental frequency of the three-phase currents.

The DQ/3-phase converter 34 executes DQ/3-phase conversion of the d-axis filter current i_d_f from the low-pass filter 32 and the q-axis filter current i_q_f from the low-pass filter 33. The DQ/3-phase converter 34 outputs a U-phase filter current i_u_f, a V-phase filter current i_v_f and a W-phase filter current i_w_f, which are obtained by this conversion, to the arithmetic unit 38.

Next, a description is given of an arithmetic operation relating to voltage instruction values for calculating the feedforward value v_z*_ff. The d-axis voltage instruction value v_d* from the automatic current regulator 22 passes through the low-pass filter 35, and is output to the DQ/3-phase converter 37 as a d-axis filter voltage instruction value v_d*_f. In addition, the q-axis voltage instruction value v_q* from the automatic current regulator 23 passes through the low-pass filter 36, and is output to the DQ/3-phase converter 37 as a q-axis filter voltage instruction value v_q*_f.

The time constant of the low-pass filter 35, 36 is greater than an inverse number of the fundamental frequency of the three-phase voltage instruction values. Besides, when the low-pass filter 35, 36 is a moving-average filter, the moving-average cycle is greater than the inverse number of the fundamental frequency of the three-phase voltage instruction values.

The DQ/3-phase converter 37 executes DQ/3-phase conversion of the d-axis filter voltage instruction value v_d*_f from the low-pass filter 35 and the q-axis filter voltage instruction value v_q*_f from the low-pass filter 36. The DQ/3-phase converter 37 outputs a U-phase filter voltage instruction value v_u*_f, a V-phase filter voltage instruction value v_v*_f and a W-phase filter voltage instruction value v_w*_f, which are obtained by this conversion, to the arithmetic unit 38.

Using the values of the filter currents of the U phase, V phase and W phase from the DQ/3-phase converter 34 and the filter voltage instruction values of the U phase, V phase and W phase from the DQ/3-phase converter 37, the arithmetic unit 38 calculates the feedforward value v_z*_ff according to the following equation (1).

$$v\_z^*\_ff = \{(1-|v\_u^*\_f|)^*i\_u\_f + (1-|v\_v^*\_f|)^*i\_v\_f + (1-|v\_w^*\_f|)^*i\_w\_f\} / \{\text{sign}(v\_u^*\_f)^*i\_u\_f + \text{sign}(v\_v^*\_f)^*i\_v\_f + \text{sign}(v\_w^*\_f)^*i\_w\_f\} \quad \text{equation (1)}$$

In equation (1), sign(v_u*_f), sign(v_v*_f), sign(v_w*_f) are signs of filter voltage instruction values of the respective phases. The feedforward value v_z*_ff is not a value which is calculated by taking into account a variation of the neutral-point potential, due to variances in leak currents of the capacitor c_p, c_n, and switching elements. Thus, feedback control is necessary. Therefore, the neutral-point potential controller 30 calculates a feedback value v_z*_fb, as described below.

A subtracter 39 subtracts the value of the DC voltage v_dc_n from the value of the DC voltage v_dc_p. A PI arithmetic unit 40 executes a PI arithmetic operation on the value from the subtracter 39.

In addition, a sign unit 41 calculates a sign of the feedforward value v_z*_ff which was calculated by the arithmetic unit 38. To calculate the sign of a certain value is to output "1" if the sign of an input value is positive, and to output "−1" if the sign of the input value is negative. A multiplier 42 multiplies together the calculated sign and the calculated value by the PI arithmetic unit 40. Thereby, a feedback value v_z*_fb is calculated. The arithmetic expression of the feedback value v_z*_fb is given by the following equation (2).

$$v\_z^*\_fb = (v\_dc\_p - v\_dc\_n)^*(kp + ki/s)^*\text{sign}(v\_z^*\_ff) \quad \text{equation (2)}$$

An adder 43 adds the feedback value v_z*_fb from the multiplier 42 to the feedforward value v_z*_ff from the arithmetic unit 38. Thereby, a zero-phase voltage instruction value v_z* is generated. As described above, this zero-phase voltage instruction value v_z* is superimposed on the U-phase voltage instruction value v_u*0, V-phase voltage instruction value v_v*0 and W-phase voltage instruction value v_w*0, which are three-phase voltage instruction values from the DQ/3-phase converter 24. Thereby, the U-phase voltage instruction value v_u*, V-phase voltage instruction value v_v* and W-phase voltage instruction value v_w*, which are the ultimate three-phase voltage instruction values to the PWM controller 25, are generated.

Only a fundamental wave component affects a neutral-point potential variation. Thus, in some cases, when the fundamental wave current component was particularly small relative to the higher harmonic wave current component, the sign of the feedforward value v_z*_ff or feedback value v_z*_fb was reversed to the normal sign due to the effect of the higher harmonic wave component. As a result, there was concern that the neutral-point potential deviates, and the application voltage to the switching element or capacitor exceeds the breakdown voltage, leading to breakdown.

In the first embodiment, the three-phase currents and three-phase voltage instruction values, which relate to the neutral-point control, are converted to the values of two axes (d axis, q axis) of the rotating coordinate system, respectively, and are passed through the low-pass filters. Further, in the first embodiment, based on the three-phase filter currents and three-phase filter voltage instruction values, which were reversely converted to the three-phase values of the coordinate system at rest, the feedforward value v_z*_ff and feedback value v_z*_fb are calculated and these values are used for the neutral-point potential control. Thereby, after the higher harmonic wave current component is eliminated from the three-phase currents, the fundamental current component can be extracted without a phase delay, and the exact neutral-point potential control can be executed even if the value of the load current is close to zero.

Therefore, the neutral-point potential can be stabilized in the region in which the load current ranges from zero to the maximum.

Second Embodiment

Next, a second embodiment is described. Incidentally, in the configuration of each of the embodiments to be described below, a detailed description of the same parts as described in the first embodiment is omitted.

Figure 4:
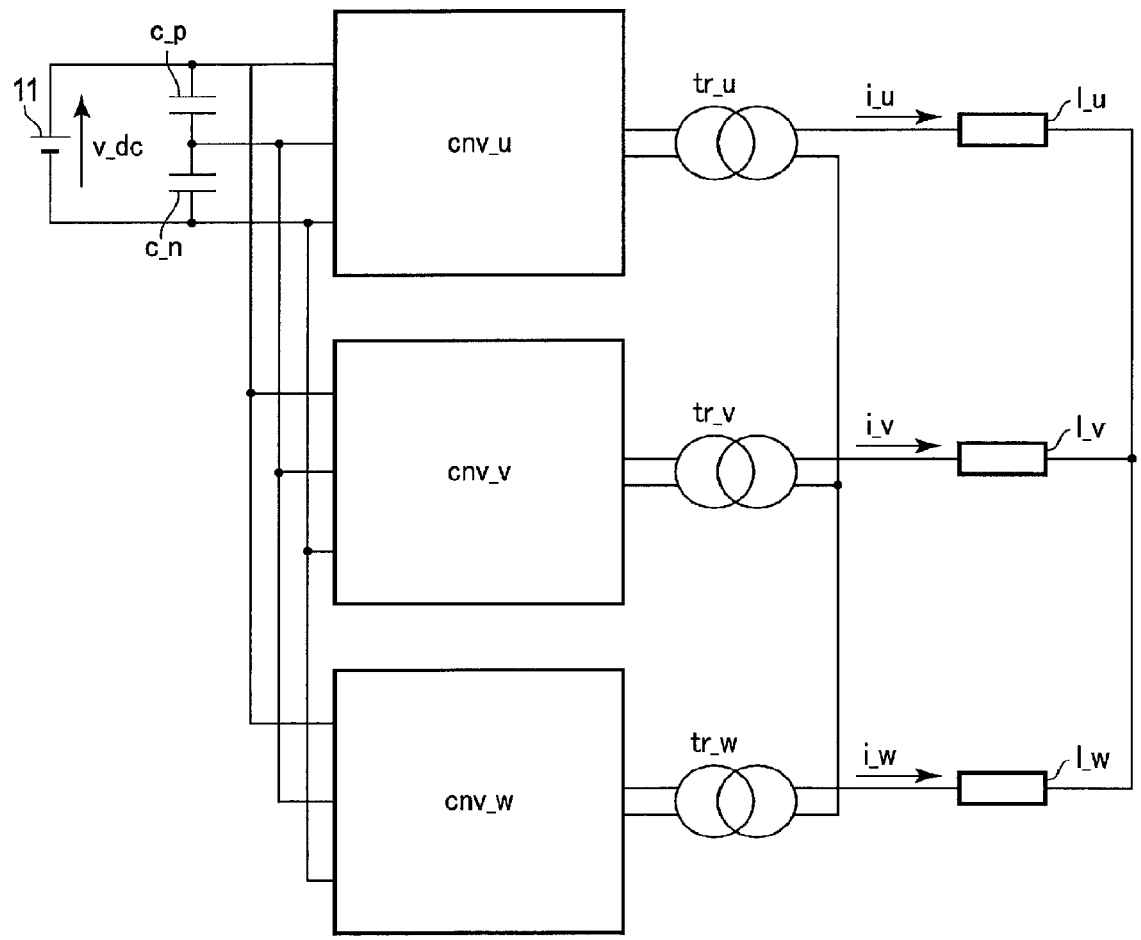
FIG. 4 is a view illustrating a configuration example of a neutral-point-clamped power converter apparatus in a second embodiment.

FIG. 4 is a view illustrating a configuration example of a neutral-point-clamped power converter apparatus in a second embodiment. FIG. 5 is a view illustrating a configuration example of an NPC leg of the neutral-point-clamped power converter apparatus in the second embodiment.

As illustrated in FIG. 4, the neutral-point-clamped power converter apparatus in the second embodiment drives, as a converter, three-phase loads l_u, l_v and l_w of the U phase, V phase and W phase. This neutral-point-clamped power converter apparatus is configured to include six NPC legs in total, such that two NPC legs for each phase are connected in parallel. In other words, this apparatus is configured to supply current to three-phase loads by using three single-phase NPC legs.

Like the first embodiment, a high-potential-side capacitor c_p and a low-potential-side capacitor c_n are connected in series between a high-potential-side terminal and a low-potential-side terminal of a DC power supply 11. These capacitors are common to each phase, and a connection point between these capacitors forms a neutral point.

Input-side terminals of a U-phase converter cnv_u, a V-phase converter cnv_v and a W-phase converter cnv_w are connected to a high-potential-side terminal, the neutral point and a low-potential-side terminal of the capacitor c_p and capacitor c_n which are common to each phase. In addition, output-side terminals of the U-phase converter cnv_u are connected to DC winding-side terminals of a U-phase transformer tr_u. Output-side terminals of the V-phase converter cnv_v are connected to DC winding-side terminals of a V-phase transformer tr_v. Output-side terminals of the W-phase converter cnv_w are connected to DC winding-side terminals of a W-phase transformer tr_w. Electric currents are supplied from AC winding-side terminals of these transformers to the three-phase loads l_u, l_v and l_w.

As illustrated in FIG. 5, the U-phase converter cnv_u is composed of two NPC legs. The V-phase converter cnv_v and W-phase converter cnv_w have the same configuration as this.

Hereinafter, taking the U phase as an example, the configuration of the NPC legs is described.

In a first NPC leg of the U phase, four self-turn-off switching elements sw_a1, sw_a2, sw_a3 and sw_a4 are connected in series from the high potential side to the low potential side, and free-wheel diodes d_a1, d_a2, d_a3 and d_a4 are connected in parallel with, and in an opposite direction to, these switching elements in a one-to-one correspondence.

Furthermore, a clamp diode d_a5 is connected between the emitter of the switching element sw_a1 and the neutral point, and a clamp diode d_a6 is connected between the neutral point and the emitter of the switching element sw_a3.

Similarly, in a second NPC leg of the U phase, four self-turn-off switching elements sw_b1, sw_b2, sw_b3 and sw_b4 are connected in series from the high potential side to the low potential side, and free-wheel diodes d_b1, d_b2, d_b3 and d_b4 are connected in parallel with, and in an opposite direction to, these switching elements in a one-to-one correspondence.

Furthermore, a clamp diode d_b5 is connected between the emitter of the switching element sw_b1 and the neutral point, and a clamp diode d_b6 is connected between the neutral point and the emitter of the switching element sw_b3.

An output voltage v_out to the U-phase transformer tr_u is output from between the emitter of the switching element sw_a2 and the collector of the switching element sw_a3, and from between the emitter of the switching element sw_b2 and the collector of the switching element sw_b3. The NPC legs of the V phase and W phase have the same configuration as this.

The neutral-point-clamped power converter apparatus in the second embodiment can execute one-pulse control which switches the switching element of the converter of each phase once in one cycle of the output AC voltage.

FIG. 6 is a view illustrating a functional configuration of a control device of the neutral-point-clamped power converter apparatus in the second embodiment.

As illustrated in FIG. 6, a control device 20b of the neutral-point-clamped power converter apparatus in the second embodiment includes a 3-phase/DQ converter 21, automatic current regulators (ACR) 22 and 23, a DQ/3-phase converter 24, a one-pulse controller 51, and a neutral-point potential controller 30b.

The functions of the 3-phase/DQ converter 21 and automatic current regulators (ACR) 22 and 23 are the same as in the first embodiment.

The DQ/3-phase converter 24 executes DQ/3-phase conversion of the d-axis voltage instruction value v_d* and q-axis voltage instruction value v_q*. By this conversion, the DQ/3-phase converter 24 obtains a U-phase voltage instruction value v_u*0, a V-phase voltage instruction value v_v*0 and a W-phase voltage instruction value v_w*0, and outputs these values to the one-pulse controller 51 as three-phase voltage instruction values.

Based on these instruction values and a sign calculation result from the neutral-point potential controller 30b, the one-pulse controller 51 generates a gate signal of the switching element corresponding to the leg of each phase, and drives each switching element by using this gate signal. In the generation of this gate signal, the one-pulse controller 51 determines the phase at which the voltage of the gate signal is raised, in accordance with the magnitude (modulation factor) of the voltage instruction value of each phase. The sign calculation by the neutral-point potential controller 30b will be described later.

Here, taking the U phase as an example, the neutral-point potential control is described.

The neutral-point potential varies when the NPC leg on one side of each phase is connected to the neutral point. Thus, the neutral-point potential becomes controllable when the output voltage v_out of the NPC leg of each phase is +v_dc/2 or −v_dc/2.

FIG. 7 is a view illustrating an example of selection of a switching pattern according to a current direction and an output voltage, by the one-pulse controller of the neutral-point-clamped power converter apparatus in the second embodiment.

As illustrated in FIG. 7, there are two switching patterns of respective switching elements by the one-pulse controller 51 for outputting output voltages +v_dc/2 and −v_dc/2, and there is redundancy in the switching patterns. By making use of this redundancy, the neutral-point potential can be controlled.

The switching pattern of the switching elements by the one-pulse controller 51, as illustrated in FIG. 7, is determined in accordance with a sign obtained by multiplying a neutral-point potential v_po−v_on (a difference between DC voltage v_dc_p and DC voltage v_dc_n) and a sign of a U-phase current i_u, that is, sign (v_po−v_on)×sign (i_u).

FIG. 8 is a block diagram illustrating a functional configuration example of the neutral-point potential controller of the control device of the neutral-point-clamped power converter apparatus in the second embodiment.

As illustrated in FIG. 8, the neutral-point potential controller 30b includes a 3-phase/DQ converter 31, low-pass filters 32 and 33, a DQ/3-phase converter 34, and sign units 61, 62, 63 and 65.

The functions of the 3-phase/DQ converter 31 and low-pass filters 32 and 33 are the same as in the first embodiment.

The DQ/3-phase converter 34 executes DQ/3-phase conversion of the d-axis filter current i_d_f from the low-pass filter 32 and the q-axis filter current i_q_f from the low-pass filter 33. By this conversion, the DQ/3-phase converter 34 obtains a U-phase filter current i_u_f, a V-phase filter current i_v_f and a W-phase filter current i_w_f. The DQ/3-phase converter 34 outputs the U-phase filter current i_u_f to the sign unit 61, the V-phase filter current i_v_f to the sign unit 62, and the W-phase filter current i_w_f to the sign unit 63.

The sign unit 61 calculates the sign of the U-phase filter current i_u_f. The sign unit 62 calculates the sign of the V-phase filter current i_v_f. The sign unit 63 calculates the sign of the W-phase filter current i_w_f.

A subtracter 64 subtracts the value of the DC voltage v_dc_n from the value of the DC voltage v_dc_p. The sign unit 65 calculates the sign of a value from the subtracter 64.

A multiplier 66 calculates a sign Sign_u for the U phase, by multiplying the sign calculated by the sign unit 61 with respect to the U-phase filter current i_u_f, and the sign calculated by the sign unit 65.

In addition, a multiplier 67 calculates a sign Sign_v for the V phase, by multiplying the sign calculated by the sign unit 62 with respect to the V-phase filter current i_v_f, and the sign calculated by the sign unit 65.

Besides, a multiplier 68 calculates a sign Sign_w for the W phase, by multiplying the sign calculated by the sign unit 63 with respect to the W-phase filter current i_w_f, and the sign calculated by the sign unit 65. The signs for the respective phases are output to the one-pulse controller 51.

In this manner, in each phase, the sign of the filter current and the sign of the neutral-point potential are used for the neutral-point potential control. Thereby, the neutral-point potential control can be executed by excluding the effect of the higher harmonic wave current.

A modification of the second embodiment is described. In this modification, the PWM control described in the first embodiment is used in place of the above-described one-pulse control.

Figure 9:
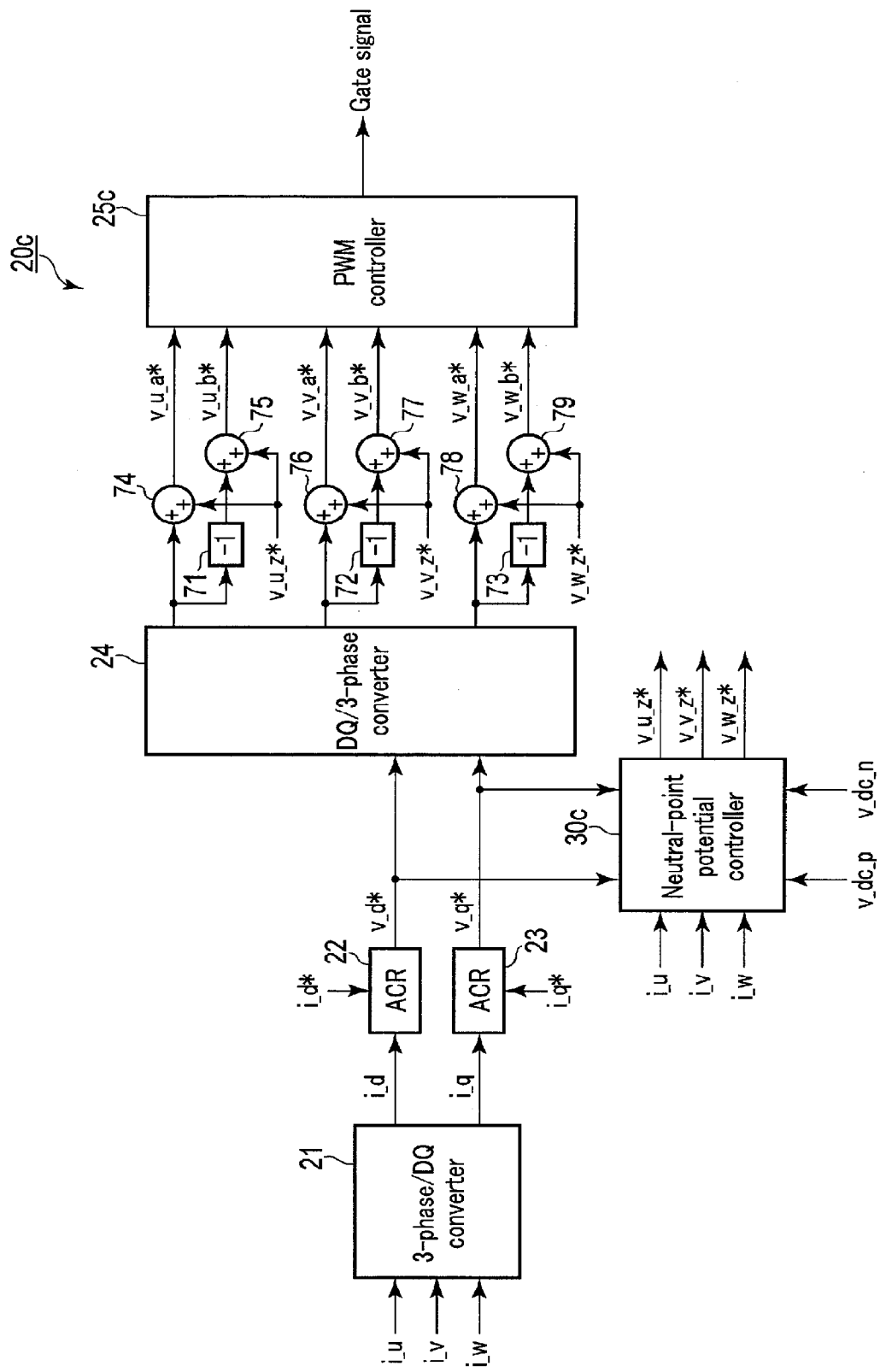
FIG. 9 is a view illustrating a modification of the configuration of the neutral-point-clamped power converter apparatus in the second embodiment.

FIG. 9 is a view illustrating a modification of the configuration of the neutral-point-clamped power converter apparatus in the second embodiment.

As illustrated in FIG. 9, a control device 20c of the neutral-point-clamped power converter apparatus in the modification of the second embodiment includes a 3-phase/DQ converter 21, automatic current regulators (ACR) 22 and 23, a DQ/3-phase converter 24, a PWM controller 25c, and a neutral-point potential controller 30c.

The functions of the 3-phase/DQ converter 21 and automatic current regulators (ACR) 22 and 23 are the same as in the first embodiment.

The DQ/3-phase converter 24 executes DQ/3-phase conversion of the d-axis voltage instruction value v_d* and q-axis voltage instruction value v_q*. By this conversion, the DQ/3-phase converter 24 obtains a U-phase voltage instruction value v_u*0, a V-phase voltage instruction value v_v*0 and a W-phase voltage instruction value v_w*0 as three-phase voltage instruction values.

An adder 74 adds a zero-phase voltage instruction value v_u_z* of the U phase, which was calculated by the neutral-point potential controller 30c, to the U-phase voltage instruction value v_u*0 generated by the DQ/3-phase converter 24. A value from the adder 74 is output to the PWM controller 25c as a U-phase voltage instruction value v_u*_a.

A multiplier 71 multiplies the U-phase voltage instruction value v_u*0 by "−1". An adder 75 adds the zero-phase voltage instruction value v_u_z* of the U phase to a value from the multiplier 71. A value from the adder 75 is output to the PWM controller 25c as a U-phase voltage instruction value v_u*_b.

The same applies to the V phase and W phase. Specifically, an adder 76 adds a zero-phase voltage instruction value v_v_z* of the V phase, which was calculated by the neutral-point potential controller 30c, to the V-phase voltage instruction value v_v*0 generated by the DQ/3-phase converter 24. A value from the adder 76 is output to the PWM controller 25c as a V-phase voltage instruction value v_v*_a.

A multiplier 72 multiplies the V-phase voltage instruction value v_v*0 by "−1". An adder 77 adds the zero-phase voltage instruction value v_v_z* of the V phase to a value from the multiplier 72. A value from the adder 77 is output to the PWM controller 25c as a V-phase voltage instruction value v_v*_b.

In addition, an adder 78 adds a zero-phase voltage instruction value v_w_z* of the W phase, which was calculated by the neutral-point potential controller 30c, to the W-phase voltage instruction value v_w*0 generated by the DQ/3-phase converter 24. A value from the adder 78 is output to the PWM controller 25c as a W-phase voltage instruction value v_w*_a.

A multiplier 73 multiplies the W-phase voltage instruction value v_w*0 by "−1". An adder 79 adds the zero-phase voltage instruction value v_w_z* of the W phase to a value from the multiplier 73. A value from the adder 79 is output to the PWM controller 25c as a W-phase voltage instruction value v_w*_b.

Based on these voltage instruction values, the PWM controller 25c generates, by PWM control, a gate signal of a switching element corresponding to the leg of each phase, and drives each switching element by using this gate signal.

Figure 10:
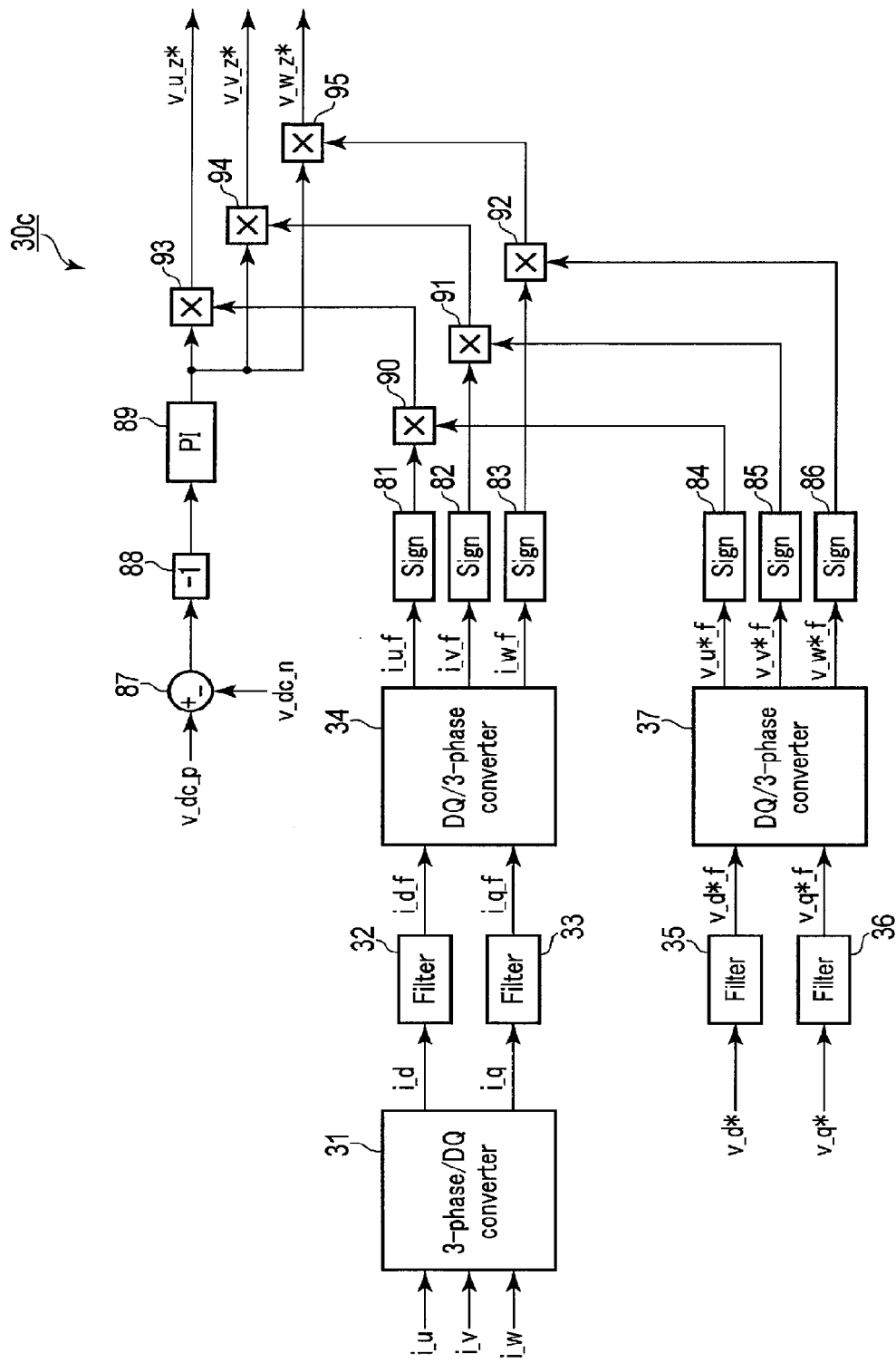
FIG. 10 is a block diagram illustrating a modification of the functional configuration of the neutral-point potential controller of the control device of the neutral-point-clamped power converter apparatus in the second embodiment.

FIG. 10 is a block diagram illustrating a modification of the functional configuration of the neutral-point potential controller of the control device of the neutral-point-clamped power converter apparatus in the second embodiment.

As illustrated in FIG. 10, the neutral-point potential controller 30c includes a 3-phase/DQ converter 31, low-pass filters 32 and 33, a DQ/3-phase converter 34, low-pass filters 35 and 36, a DQ/3-phase converter 37, and sign units 81, 82, 83, 84, 85 and 86.

The functions of the 3-phase/DQ converter 31 and low-pass filters 32, 33, 35 and 36 are the same as in the first embodiment.

The DQ/3-phase converter 34 executes DQ/3-phase conversion of the d-axis filter current i_d_f from the low-pass filter 32 and the q-axis filter current i_q_f from the low-pass filter 33. Thereby, the DQ/3-phase converter 34 obtains a U-phase filter current i_u_f, a V-phase filter current i_v_f and a W-phase filter current i_w_f. The DQ/3-phase converter 34 outputs the U-phase filter current i_u_f to a sign unit 81, the V-phase filter current i_v_f to a sign unit 82, and the W-phase filter current i_w_f to a sign unit 83.

The sign unit 81 calculates the sign of the U-phase filter current i_u_f. The sign unit 82 calculates the sign of the V-phase filter current i_v_f. The sign unit 83 calculates the sign of the W-phase filter current i_w_f.

The DQ/3-phase converter 37 executes DQ/3-phase conversion of the d-axis filter voltage instruction value v_d*_f from the low-pass filter 35 and the q-axis filter voltage instruction value v_q*_f from the low-pass filter 36. Thereby, the DQ/3-phase converter 37 obtains a U-phase filter voltage instruction value v_u*_f, a V-phase filter voltage instruction value v_v*_f and a W-phase filter voltage instruction value v_w*_f. The DQ/3-phase converter 37 outputs the U-phase filter voltage instruction value v_u*_f to a sign unit 84, the V-phase filter voltage instruction value v_v*_f to a sign unit 85, and the W-phase filter voltage instruction value v_w*_f to a sign unit 86.

The sign unit 84 calculates the sign of the U-phase filter voltage instruction value v_u*_f. The sign unit 85 calculates the sign of the V-phase filter voltage instruction value v_v*_f. The sign unit 86 calculates the sign of the W-phase filter voltage instruction value v_w*_f.

A subtracter 87 subtracts the value of the DC voltage v_dc_n from the value of the DC voltage v_dc_p. A multiplier 88 multiplies a value from the subtracter 87 by "−1". A PI arithmetic unit 89 executes a PI arithmetic operation on the value from the multiplier 88.

In addition, a multiplier 90 multiplies the sign of the U-phase filter current i_u_f as the sign calculated by the sign unit 81, and the sign of the U-phase filter voltage instruction value v_u*_f as the sign calculated by the sign unit 84. A multiplier 93 multiplies a sign, which is a calculation result of the multiplier 90, and a calculation value by the PI arithmetic unit 89, thereby outputting a zero-phase voltage instruction value v_u_z* of the U phase.

A multiplier 91 multiplies the sign of the V-phase filter current i_v_f as the sign calculated by the sign unit 82, and the sign of the V-phase filter voltage instruction value v_v*_f as the sign calculated by the sign unit 85. A multiplier 94 multiplies a sign, which is a calculation result of the multiplier 91, and the calculation value by the PI arithmetic unit 89, thereby outputting a zero-phase voltage instruction value v_v_z* of the V phase.

A multiplier 92 multiplies the sign of the W-phase filter current i_w_f as the sign calculated by the sign unit 83, and the sign of the W-phase filter voltage instruction value v_w*_f as the sign calculated by the sign unit 86. A multiplier 95 multiplies a sign, which is a calculation result of the multiplier 92, and the calculation value by the PI arithmetic unit 89, thereby outputting a zero-phase voltage instruction value v_w_z* of the W phase.

Unlike the first embodiment, in the case of using the single-phase NPC as in the modification of the second embodiment, the neutral-point potential does not vary in principle. Thus, the above-described feedforward control is needless, and it should suffice if feedback control using the subtracter 87, multiplier 88 and PI arithmetic unit 89 is executed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A control device of a neutral-point-clamped power converter apparatus, comprising:
a 3-phase/2-phase converter configured to convert three-phase currents flowing to three-phase loads, which are driven by the neutral-point-clamped power converter apparatus that is connected to a DC power supply having three potentials and is capable of outputting voltages of three levels, to a d-axis current and a q-axis current of a rotating coordinate system;
a 2-phase/3-phase current converter configured to convert a d-axis filter current and a q-axis filter current, which were obtained by passing the d-axis current and the q-axis current through a filter having a time constant which is greater than an inverse number of a fundamental wave frequency of the three-phase currents, to three-phase currents;
a neutral-point potential controller configured to calculate, based on the three-phase currents converted by the 2-phase/3-phase current converter, a zero-phase voltage instruction value for controlling voltages into which a DC input voltage is divided at a neutral point of the power converter apparatus, as an instruction value which is superimposed on three-phase voltage instruction values for the power converter apparatus; and
a 2-phase/3-phase voltage converter configured to convert a d-axis filter voltage instruction value and a q-axis filter voltage instruction value, which were obtained by passing a d-axis voltage instruction value and a q-axis voltage instruction value of the rotating coordinate system through a filter having a time constant which is greater than an inverse number of a fundamental wave frequency of the three-phase voltage instruction values, to three-phase voltage instruction values,
wherein the neutral-point potential controller is configured to calculate the zero-phase voltage instruction value by calculating a zero-phase voltage feedforward instruction value for controlling the voltages into which the DC input voltage is divided at the neutral point, based on the three-phase currents converted by the 2-phase/3-phase current converter and the three-phase voltage instruction values converted by the 2-phase/3-phase voltage converter.

2. The control device of the neutral-point-clamped power converter apparatus of claim 1, wherein the neutral-point potential controller is configured to calculate a zero-phase voltage feedback instruction value, based on a difference between a high-potential-side voltage and a low-potential-side voltage which are divided at the neutral point, and a sign of the zero-phase voltage feedforward instruction value, and configured to calculate the zero-phase voltage instruction value, based on the zero-phase voltage feedback instruction value and the zero-phase voltage feedforward instruction value.

3. A control device of a neutral-point-clamped power converter apparatus, comprising:
- a 3-phase/2-phase converter configured to convert three-phase currents flowing to three-phase loads, which are driven by the neutral-point-clamped power converter apparatus that is connected to a DC power supply having three potentials and is capable of outputting voltages of three levels, to a d-axis current and a q-axis current of a rotating coordinate system;
- a 2-phase/3-phase current converter configured to convert a d-axis filter current and a q-axis filter current, which were obtained by passing the d-axis current and the q-axis current through a filter having a time constant which is greater than an inverse number of a fundamental wave frequency of the three-phase currents, to three-phase currents;
- a neutral-point potential controller configured to calculate, based on the three-phase currents converted by the 2-phase/3-phase current converter, a zero-phase voltage instruction value for controlling voltages into which a DC input voltage is divided at a neutral point of the power converter apparatus, as an instruction value which is superimposed on three-phase voltage instruction values for the power converter apparatus; and
- a 2-phase/3-phase voltage converter configured to convert a d-axis filter voltage instruction value and a q-axis filter voltage instruction value, which were obtained by passing a d-axis voltage instruction value and a q-axis voltage instruction value of the rotating coordinate system through a filter having a time constant which is greater than an inverse number of a fundamental wave frequency of the three-phase voltage instruction values, to three-phase voltage instruction values,
- wherein the neutral-point potential controller is configured to calculate the zero-phase voltage instruction value, based on
  - (a) signs of the three-phase currents converted by the 2-phase/3-phase current converter,
  - (b) signs of the three-phase voltage instruction values converted by the 2-phase/3-phase voltage converter, and
  - (c) a difference between a high-potential-side voltage and a low-potential-side voltage which are divided at the neutral point.

4. A control method of a neutral-point-clamped power converter apparatus which is connected to a DC power supply having three potentials and is capable of outputting voltages of three levels, the method comprising:
- converting three-phase currents flowing to three-phase loads, which are driven by the power converter apparatus, to a d-axis current and a q-axis current of a rotating coordinate system;
- converting a d-axis filter current and a q-axis filter current, which were obtained by passing the d-axis current and the q-axis current through a filter having a time constant which is greater than an inverse number of a fundamental wave frequency of the three-phase currents, to three-phase currents;
- calculating, based on the converted three-phase currents, a zero-phase voltage instruction value for controlling voltages into which a DC input voltage is divided at a neutral point of the power converter apparatus, as an instruction value which is superimposed on three-phase voltage instruction values for the power converter apparatus;
- converting a d-axis filter voltage instruction value and a q-axis filter voltage instruction value, which were obtained by passing a d-axis voltage instruction value and a q-axis voltage instruction value of the rotating coordinate system through a filter having a time constant which is greater than an inverse number of a fundamental wave frequency of the three-phase voltage instruction values, to three-phase voltage instruction values; and
- calculating, based on the converted three-phase currents and the converted three-phase voltage instruction values, the zero-phase voltage instruction value by calculating a zero-phase voltage feedforward instruction value for controlling the voltages into which the DC input voltage is divided at the neutral point.

5. A control method of a neutral-point-clamped power converter apparatus which is connected to a DC power supply having three potentials and is capable of outputting voltages of three levels, the method comprising:
- converting three-phase currents flowing to three-phase loads, which are driven by the power converter apparatus, to a d-axis current and a q-axis current of a rotating coordinate system;
- converting a d-axis filter current and a q-axis filter current, which were obtained by passing the d-axis current and the q-axis current through a filter having a time constant which is greater than an inverse number of a fundamental wave frequency of the three-phase currents, to three-phase currents;
- calculating, based on the converted three-phase currents, a zero-phase voltage instruction value for controlling voltages into which a DC input voltage is divided at a neutral point of the power converter apparatus, as an instruction value which is superimposed on three-phase voltage instruction values for the power converter apparatus;
- converting a d-axis filter voltage instruction value and a q-axis filter voltage instruction value, which were obtained by passing a d-axis voltage instruction value and a q-axis voltage instruction value of the rotating coordinate system through a filter having a time constant which is greater than an inverse number of a fundamental wave frequency of the three-phase voltage instruction values, to three-phase voltage instruction values; and
- calculating the zero-phase voltage instruction value, based on
  - (a) signs of the converted three-phase currents,
  - (b) signs of the converted three-phase voltage instruction values, and
  - (c) a difference between a high-potential-side voltage and a low-potential-side voltage which are divided at the neutral point.

* * * * *